(No Model.)
J. WEISS.
SCREW DRIVER.
No. 414,619. Patented Nov. 5, 1889.
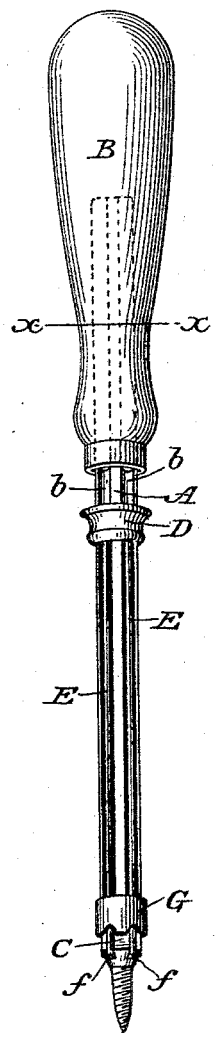
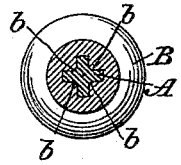
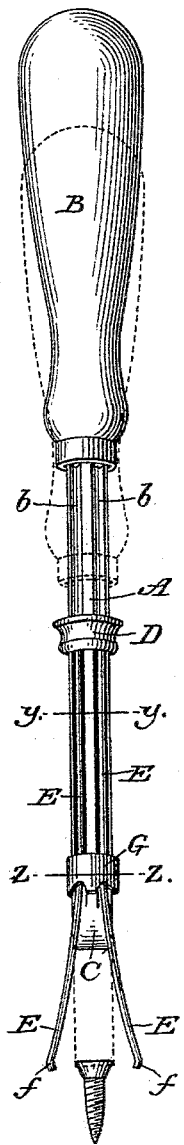
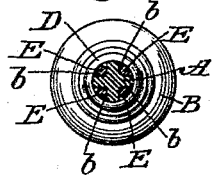
Attest:
A. N. Jesbera
E. M. Watson
Inventor:
Julius Weiss
By David A. Burr
Atty.

UNITED STATES PATENT OFFICE.

JULIUS WEISS, OF NEW YORK, N. Y.

SCREW-DRIVER.

SPECIFICATION forming part of Letters Patent No. 414,619, dated November 5, 1889.

Application filed August 19, 1889. Serial No. 321,210. (No model.)

*To all whom it may concern:*

Be it known that I, JULIUS WEISS, of the city, county, and State of New York, have invented certain new and useful Improvements in Screw-Drivers; and I do hereby declare that the following is a full and exact description thereof, reference being had to the accompanying drawings, and to the letters of reference marked thereon, making a part of this specification.

This invention relates to that class of screw-drivers having appliances for holding the screw until it is started in the wood.

It has for its object to provide a screw-driver by which the screw to be driven may be readily inserted into a deep recess or between the members in the mechanism of a clock or other machine to a point out of reach of the fingers and as readily removed therefrom, even where the space is but little larger than the head of the screw.

It consists in the combination, with a longitudinally-grooved stem or shank which terminates in a driving-blade, of three or more elastic arms fitted to move longitudinally in the longitudinal grooves of the stem or shank, and not project beyond the periphery thereof, and which are secured at their inner ends to a collar sliding on the stem, and are drawn together and closed in upon the blade by means of an encircling band or collar sliding upon them, substantially in manner and form as hereinafter described and claimed.

In the accompanying drawings, Figure 1 is an elevation of my improved screw-driver with its clamping device closed upon a screw to hold it against the blade of the instrument; Fig. 2, a similar view illustrating the screw released by the extension and expansion of the outer ends of the clamping-wires. Fig. 3 is a transverse section in line $x\,x$ through the handle; Fig. 4, a similar cross-section through the shank in line $y\,y$; and Fig. 5, an enlarged transverse section in line $z\,z$, through the sliding collar moving over the clamping-wires, detached.

A represents the shank or stem of the screw-driver, and B the handle into which it is inserted. The stem A is longitudinally channelled from end to end with three or more grooves $b\,b\,b$, extending its entire length. These grooves serve the double purpose of affording a firm hold for the stem within the handle B, into which it is driven to prevent the handle from turning independently thereon, and of furnishing longitudinal recesses in which to fit the clamping-wires. These grooves may be either angular in cross-section, as shown in Fig. 3, or curved. The outer end of the stem or shank is made to form, in the customary manner, a driving-blade C, adapted to engage the nick in the head of the screw to be driven.

D is a collar fitted to slide freely upon the stem A. To this collar are secured elastic rods E E E E, of a diameter small enough to fit easily within the longitudinal grooves $b\,b$ of the stem A, and preferably, as shown in Fig. 4, to lie wholly within the same, and project but slightly, if at all, beyond the periphery thereof, so that the diameter of the combined stem and rods shall not exceed materially that of the stem alone. The rods E E are of a length somewhat less than that of the portion of the stem projecting beyond its handle, so that by sliding the collar D toward the handle the outer ends of the rods may be brought to the end of the blade C. These ends are each bent slightly inward, as at $f\,f$, to form clamping-jaws to take hold of the head of a screw when closed in thereon. The rods are so bent as that normally they will have a tendency to spring apart at their outer ends, as shown in Fig. 2; but they are drawn inward and confined in their seats in the grooves $b\,b$ by means of a sliding band or sleeve G, fitted to embrace them closely and slide over them upon the stem A of the screw-driver. Where the rods E E are so thick as to project beyond the circumference of the stem to which they are fitted, the inner periphery of the band G is notched, as shown in Fig. 5, to embrace the projecting portion, with a view of reducing the thickness of the sliding band to a minimum, so that it may pass into or through an opening of a diameter but slightly larger than that of the stem.

In the use of the device for removing a screw, the band G is slipped back toward the collar D, thereby allowing the outer ends of the rods E E to spring apart in readiness to clasp the screw; and the rods may also be projected beyond the blade, as shown in Fig.

2, either by drawing the stem A back through the collar D, or by sliding the collar forward upon the stem. When the screw is reached and the end of the blade pushed forward and fitted in the nick thereof, the jaws $f f$ are made to close upon and clasp its head by simply sliding the band G toward the blade. The screw will thus be firmly held, as shown in Fig. 1, without interfering with the hold of the blade thereon or its rotation, so that when turned out of its seat the screw will remain on the end of the blade, to be withdrawn therewith. In like manner, when it is desired to insert a screw at a point not readily reached by the fingers, the screw may be clamped upon the blade, as shown in Fig. 1, and thereby readily carried to the desired position in readiness to be driven home by the screw-driver.

When it is not required to make use of the clamping-jaws, they are simply drawn in upon the blade far enough back from its end not to interfere therewith, and, being clasped down tightly in their seats upon the stem, serve to re-enforce it without increasing its size.

A neat, strong, slender tool is thus produced, capable of seizing and holding as well as driving a screw when required, and with which the screw may be placed in or removed from otherwise inaccessible positions. It has the advantage over other screw-drivers furnished with spring-jaws, which by means of a sliding ring or band can be made to seize and hold the screw-head independently of the driving-blade and to operate in combination therewith, that the rods terminating in the clamping-jaws lie in the longitudinal grooves of the shank below the face of the outer periphery thereof, and consequently do not obstruct the movement of the screw-driver, and when closed in do not enlarge its diameter. The longitudinal grooves at the inner end of the shank, moreover, permit the intervening ribs to take such a firm hold of the wood of the handle into which it is inserted as to render the connection of the two very firm and stable.

I claim as my invention—

A screw-driver having a cylindrical stem longitudinally grooved from end to end, in combination with elastic rods seated within said grooves to slide longitudinally therein, and bent at their outer ends to form clamping-jaws, a collar sliding upon said cylindrical stem and to which the inner ends of the rods are secured, and a band sliding upon the rods and clasping them within the grooves upon the stem, all substantially in the manner and for the purpose herein set forth.

In testimony whereof I have signed my name to this specification in the presence of two subscribing witnesses.

JULIUS WEISS.

Witnesses:
RICHARD CHRISTY,
A. N. JESBERA.